March 6, 1928. 1,661,988
E. B. AYRES
SPIRAL GEAR BOX
Filed Oct. 15, 1925 3 Sheets-Sheet 3
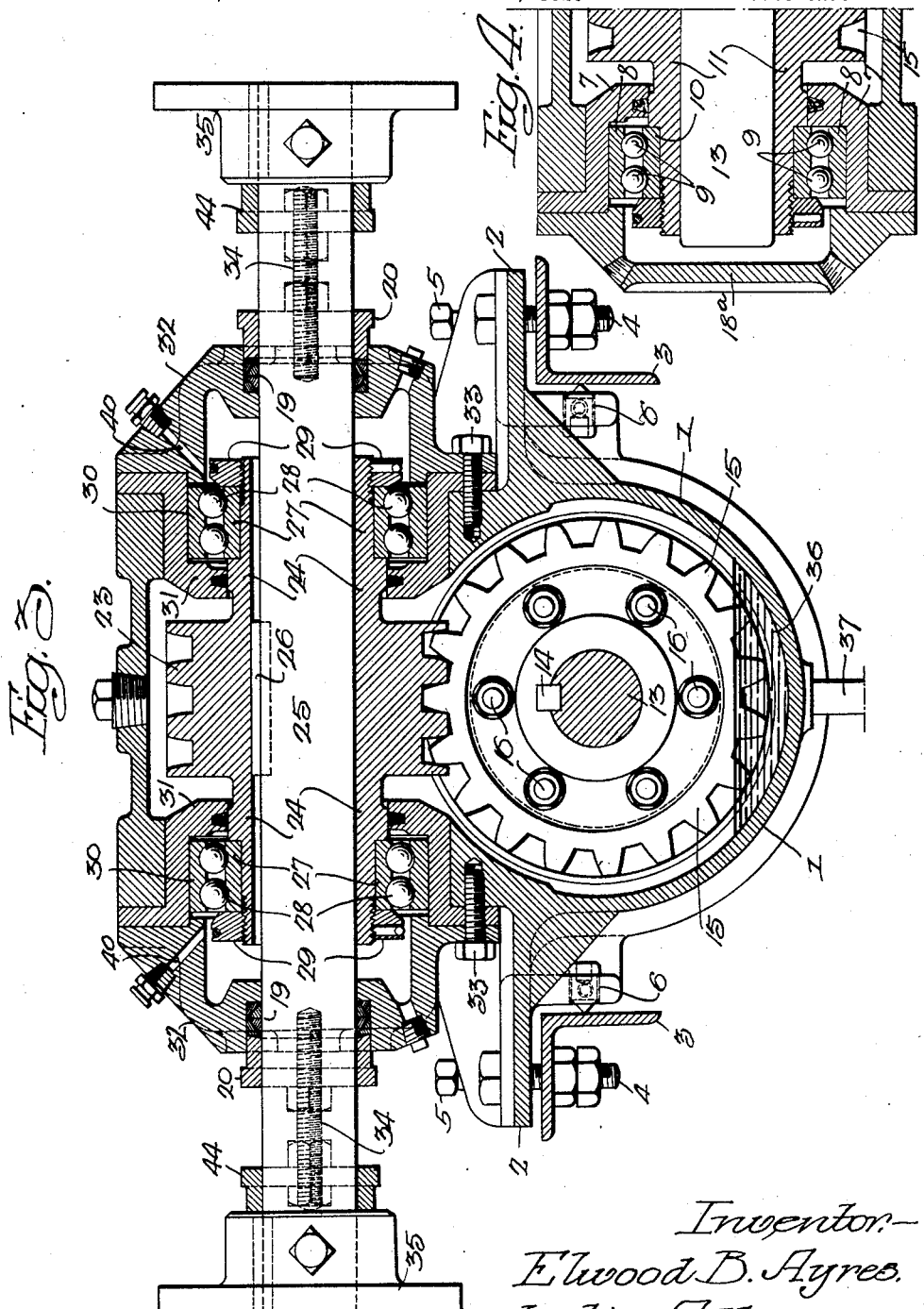
Inventor:-
Elwood B. Ayres,
by his Attorneys:-
Howson & Howson Patented Mar. 6, 1928.

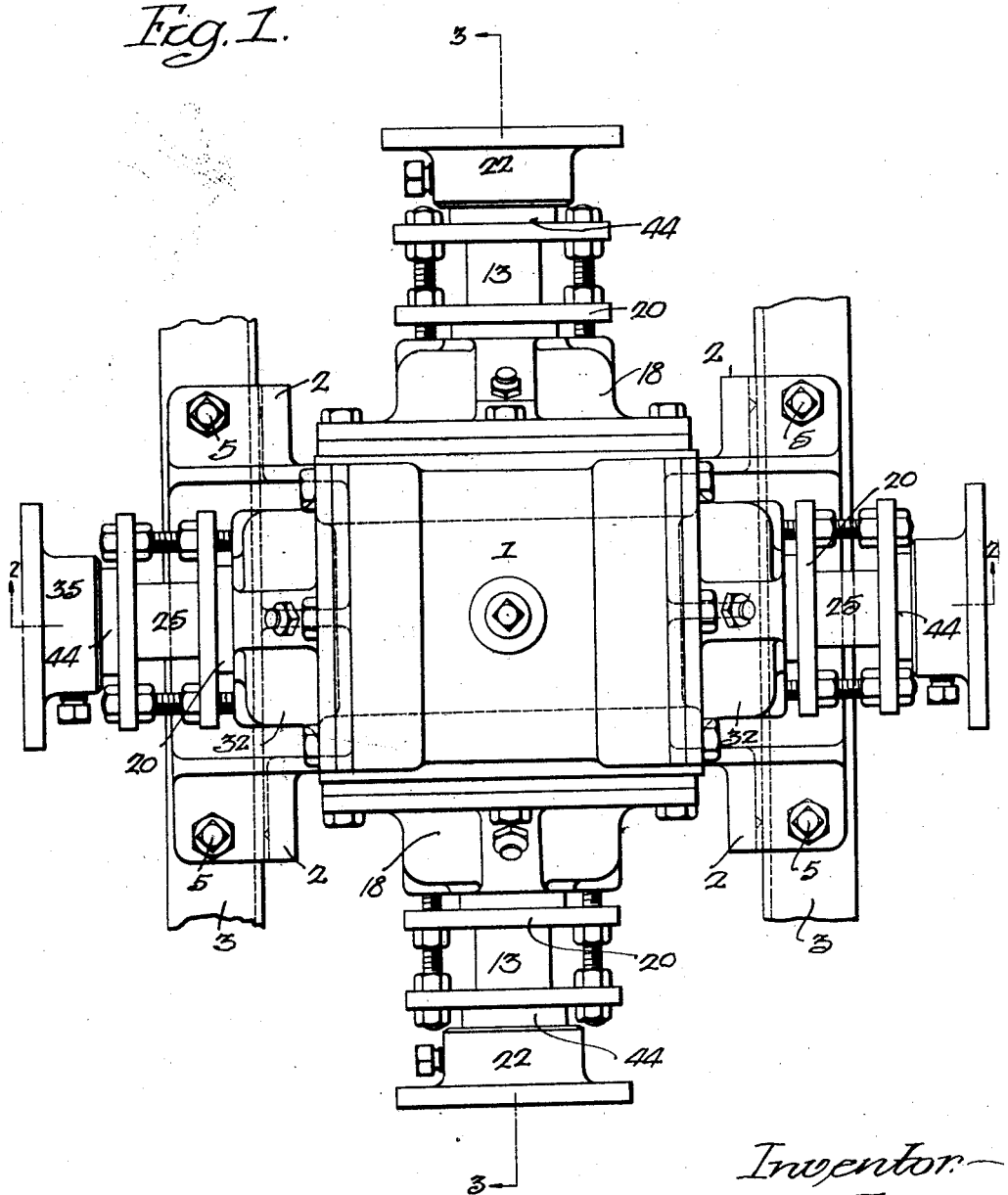

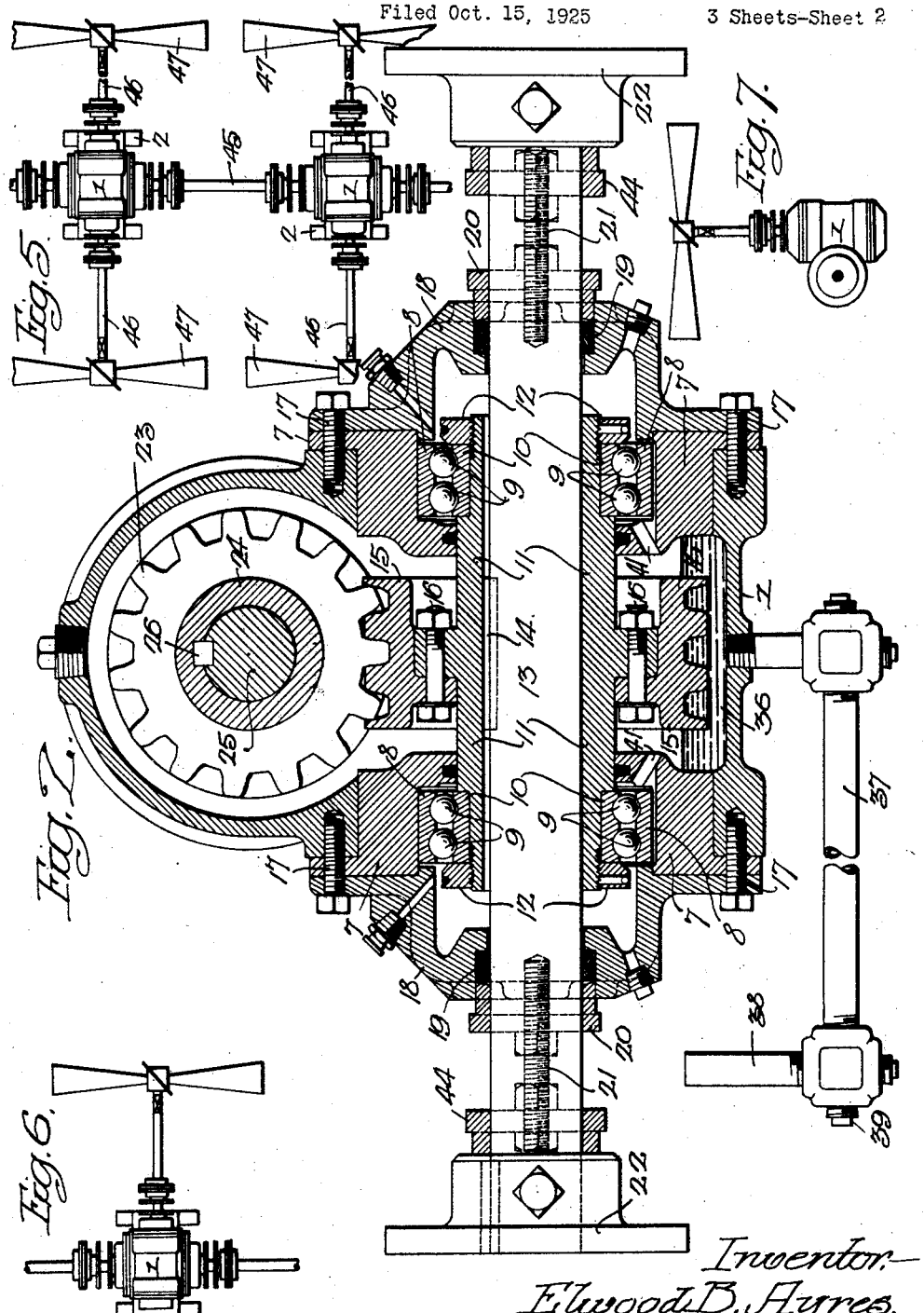

1,661,988

UNITED STATES PATENT OFFICE.

ELWOOD B. AYRES, OF MELROSE PARK, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

SPIRAL-GEAR BOX.

Application filed October 15, 1925. Serial No. 62,563.

The object of my invention is to design a spiral gear box that can be used in driving one or more shafts from a drive shaft at any angle desired, and to construct the gear box so that it can be made standard and in quantities, and applied to machines when one shaft is driven from another shaft at an angle.

My invention is especially adapted for use in driving fan shafts of drying apparatus from a main shaft. In some instances the fan shafts are horizontal, and in other instances they are vertical, and in many cases a number of fans are driven from the main drive shaft.

In the accompanying drawings:

Fig. 1 is a plan view of my improved universal gear box;

Fig. 2 is a longitudinal sectional view on the line 2—2, Fig. 1;

Fig. 3 is a transverse sectional view on the line 3—3, Fig. 1;

Fig. 4 is a view showing a solid cap closing one end of the casing;

Figs. 5, 6 and 7 are outline views showing the application of the invention to fan drives.

The casing 1 of the gear box has lateral ears 2, which extend over angle beams 3 of a supporting frame, and are secured to the beams by bolts 4. Set-screws 5 bear upon the upper faces of the angle bars, and set-screws 6 bear against the sides of the bars 3, as shown in Fig. 3. By this construction accurate adjustment of the casing is secured. The casing has two through openings, on different planes, one opening being at right angles to the other opening.

Flanged bearing-boxes 7 are located in the open ends of the casing 1 and carry the outer ball-races 8 for the anti-friction balls 9. The inner ball-races 10 are clamped against shoulders of a long hub 11 by threaded lock nuts 12 mounted on the threaded end of the hub, as shown in Fig. 2. The hub 11 is secured to the driving shaft 13 by a key 14, and has a flange to which the spiral gear wheel 16 is secured thereto by bolts 16.

The flanges of the bearing-boxes 7 have holes for the passage of bolts 17 which secure the boxes to the casing. These bolts 17 also extend through holes in the flanges of the caps 18 in which are packing rings 19 held in proper relation to the shaft 13 by glands 20 adjustably mounted on studs 21. Secured to each end of the shaft 13 are coupling disks 22, by which the shaft is secured by bolts to the disks of other sections of shafts which may connect the gear-box to other gear-boxes, if necessary.

The spiral gear wheel 15 meshes with a spiral gear wheel 23, having an integral hub 24 secured to a driven shaft 25 by a key 26. On the outer end of the hub are secured the inner raceways 27 for the balls 28. The inner raceways are held against shoulders on the hub by lock nuts 29, Fig. 3. The outer raceways 30 are located in flanged bearing-boxes 31 similar to those for the shaft 13. Flanged caps 32 enclose the ends of the bearing-boxes, and bolts 33 secure both the caps and the bearing-boxes to the casing. In the caps 32 are packing rings 19 held in place by glands 20 on studs 34. On each end of the shaft 25 are coupling disks 35 by which the gear shaft can be attached to a fan shaft or shafts carrying other appliances.

The casing 1 encloses both spiral gears 15 and 23. In order to keep the gears and ball-bearings well lubricated, the lower portion 36 of the casing forms a well for lubricant. This well is connected to an oil pipe 37 which terminates in an overflow stand pipe 38, which keeps the oil at the proper level in the well. In the pipe 37 is a drainage plug 39. Oil passages 40 are formed in the several caps and are directed towards the ball-races. These passages are closed by suitable plugs. Passages 41 lead from the ball-races to the well 36, and plugged drainage openings 42 are formed in the bottom of the caps as shown. Felt rings 43 are located in grooves in the bearings at the inner sides of the ball-bearings.

When a single unit is used, then stop-collars 44 are located back of the coupling disks 22—22 and 35—35. These collars are adjustably mounted on the stud-bolts 21 and 34. By adjusting the nuts on the stud-bolts, the shafts can be properly located. When a series of gear-boxes are used, then only one gear-box may be provided with the stop-collars.

If the driven shaft extends at one side only of the gear-box, the shaft may terminate in the box, and a solid cap 18ª may be used to close the end of the box, as shown in Fig. 4.

Fig. 5 is an outline view showing two gear-boxes coupled together and to a driving shaft 45. The driven shafts are attached to shafts 46—46 having fans 47 at their outer ends.

Fig. 6 shows a gear-box with the driven shaft extending at one side only and attached to a fan shaft, the opposite end of the gear-box being closed by the cap shown in Fig. 4.

Fig. 7 is a view showing a horizontal driving shaft coupled to a vertical fan shaft by the gear-box.

It will be seen by the above description that the gear-box can be applied in any manner desired, so that one standard gear-box, for instance, can be used on all types of driers.

I claim:

1. The combination in a spiral gear-box, of a casing having two through openings, one at right angles to the other and on different planes; flanged bearing-boxes closing the ends of the openings; ball-bearings in the boxes; two hubs, one hub being located in one through opening and the other hub in the other through opening, each hub extending through the ball-bearings and forming a support for the inner races for said bearings; a cap plate beyond the bearing-boxes and having packing; a shaft extending through each hub and through the packing in the cap plates, said shafts being keyed to the hubs; and bolts securing the cap-plates and the flanged bearing-boxes to the casing.

2. The combination in a casing, two shafts mounted in bearings in the casing, one shaft being at right angles to the other; a spiral gear-wheel on each shaft, said gears meshing one with the other; caps enclosing the ends of the casing; packing within the caps; glands bearing against the packing; stud-bolts extending through the glands; and stop-collars adjustably mounted on the stud-bolts, each shaft having a coupling-disk, the stop-collars bearing against the rear ends of the coupling-disks and holding the shafts against longitudinal movement.

ELWOOD B. AYRES.